United States Patent [19]
Gipson, Jr.

[11] Patent Number: 4,978,104
[45] Date of Patent: Dec. 18, 1990

[54] QUICK RELEASE JACK

[76] Inventor: James H. Gipson, Jr., 1010 N. Ella, Searcy, Ark. 72143

[21] Appl. No.: 349,766

[22] Filed: May 10, 1989

[51] Int. Cl.$^5$ .............................................. B60S 9/02
[52] U.S. Cl. .................................... 254/420; 254/97; 254/427
[58] Field of Search ............ 254/418, 420, 427, 95–97; 269/213, 214

[56] References Cited

U.S. PATENT DOCUMENTS

| | | | |
|---|---|---|---|
| 968,223 | 8/1910 | Willour | 254/97 |
| 1,324,721 | 12/1919 | Benedict | 254/97 |
| 3,921,958 | 11/1975 | Brockelsby et al. | 254/420 |
| 3,934,852 | 1/1976 | Weber et al. | 254/420 |
| 4,702,458 | 10/1987 | Kendrick | 254/427 |
| 4,848,735 | 7/1989 | Pittman | 254/427 |

*Primary Examiner*—J. J. Hartman
*Attorney, Agent, or Firm*—Stephen D. Carver

[57] ABSTRACT

A quick-release rack and pinion safety jack assembly for mounting upon the tongue of a conventional trailer. The jack assembly comprises a vertical support stanchion extending upwardly from a rotatable caster, a rigid rack, and a weatherproof box-like gear housing penetrated by the stanchion. A rotatable hand crank is rotated to move the stanchion relative to the gear housing, to elevate or lower the trailer. The internal gear assembly comprises a worm gear driven by the hand crank and a drive gear driven by the worm which selectively meshes or unmeshes with the rack. The drive gear is mounted for rotation upon a rigid axle which penetrates elongated follower slots defined in opposite walls of the gear housing. The drive gear axle is coupled at its ends by rigid links rotatably anchored in a pivotal safety lever. The safety lever is manually deflectable along an arcuate path between a first lock position and a second released position. As the lever is deflected downwardly from its "locked" position, the drive gear moves horizontally along the worm out of engagement with the rack. When the lever is returned to its lock position, the drive gear rotates along the worm gear and then meshes with the rack. When the drive gear is unmeshed from the rack, the stanchion slides freely relative to the housing for height adjustments without cranking.

7 Claims, 5 Drawing Sheets

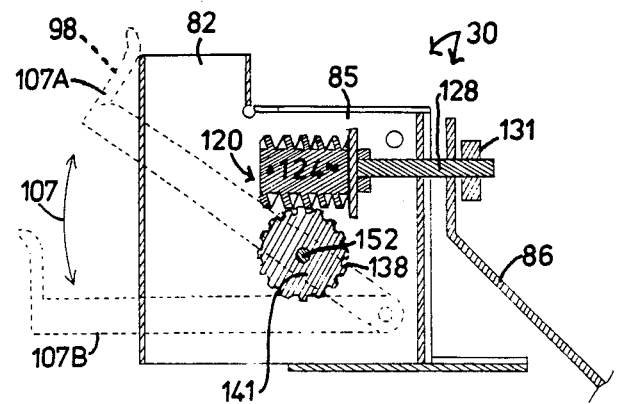
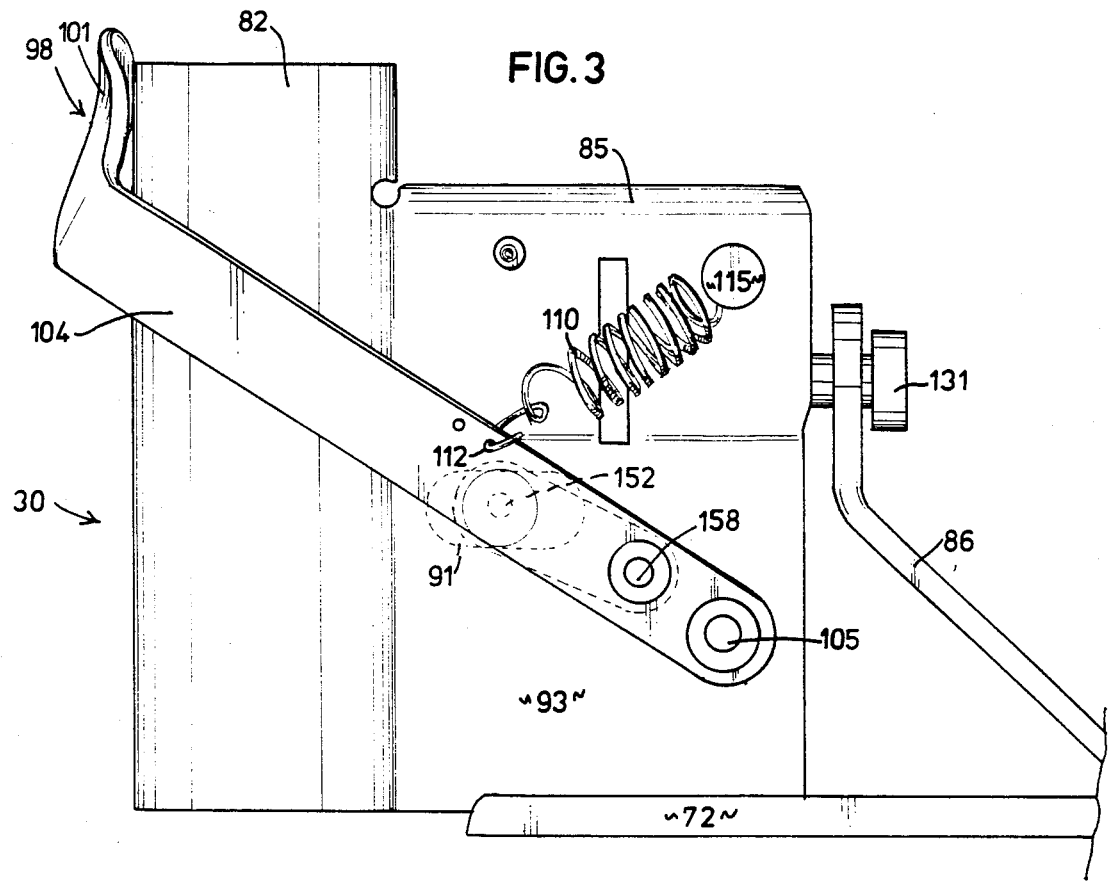

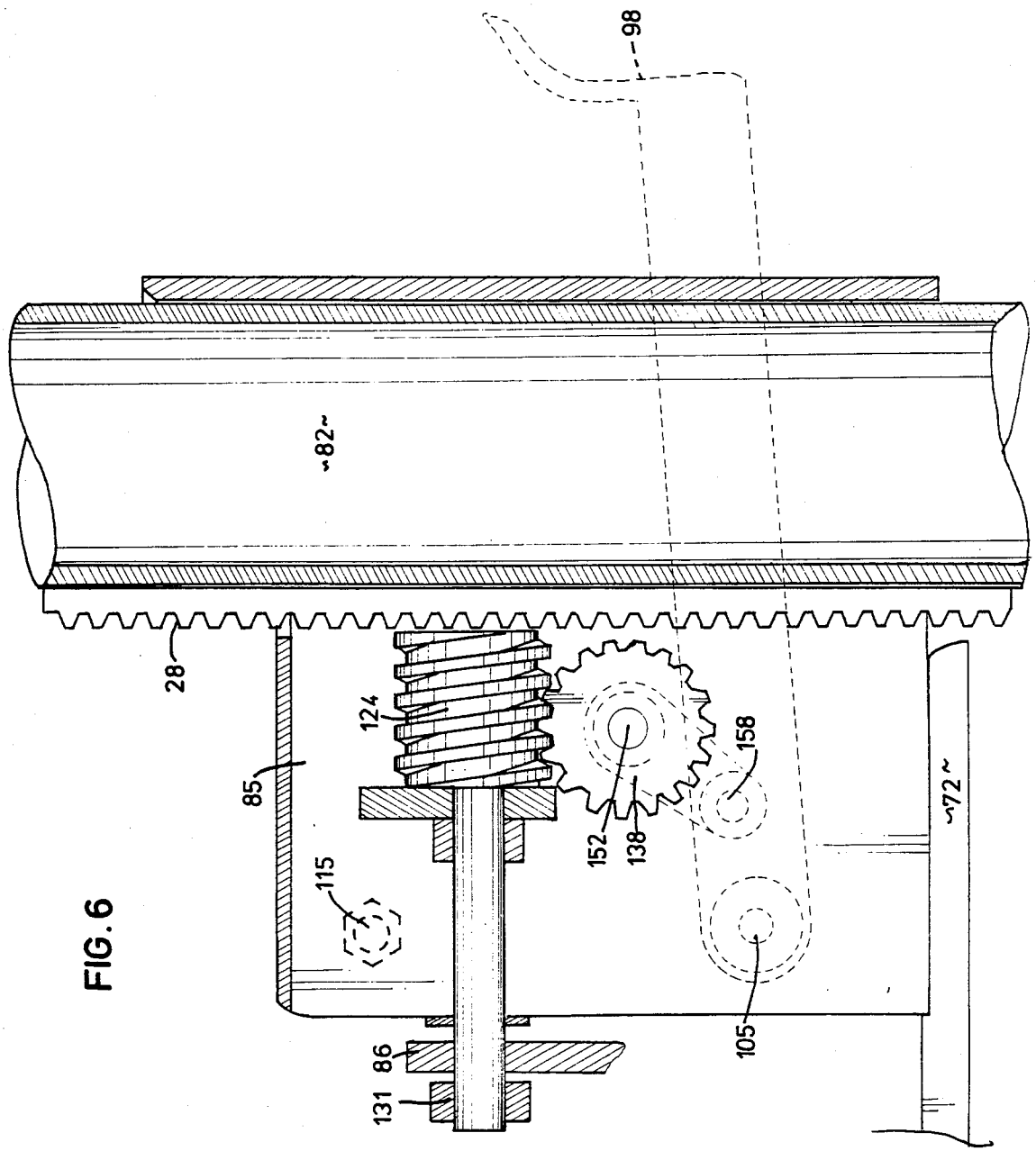

QUICK RELEASE JACK

BACKGROUND OF THE INVENTION

The present invention relates broadly to manual rack and pinion jacks used in conjunction with recreational boat trailers. More particularly, the present invention relates to a rack and pinion jack having a safety quick-release mechanism which facilitates quick and convenient lowering or raising of the jack during use. Moreover, the present invention relates to a safety quick-release gear assembly adapted to be retro-fitted to an existing rack and pinion jack. The invention is believed best classified in U.S. utility class 254, subclass 97.

It has long been known to employ rack and pinion mechanisms in jacks. Typical jacks comprise a stanchion adapted to contact a supporting surface and a stanchion-control housing coupled to the trailer tongue or bumper of the vehicle to be elevated. Such jacks generally comprise a lever or crank which engages an internal gear for vertically moving the stanchion relative to the housing. This in turn elevates or lowers the trailer tongue relative to the tow vehicle. Representative prior art rack and pinion jacks are described by Ketel, U.S. Pat. No. 2,233,135, issued Feb. 25, 1941 and in U.S. Pat. No. 3,466,011, issued to Hewes et al. on Sept. 9, 1969. It is also known in the prior art to provide some form of safety latching mechanism to prevent accidental disengagement of the gear assembly from the rack, which might cause an unexpected and dangerous drop of the trailer.

As will be appreciated by sportsman and hobbyists familiar with the use of typical prior art jacks, a jack may be raised or lowered several times during a particular outing. Trailer jacks typically used with recreational boats are normally semi-permanently mounted upon the boat trailer tongue and must be raised above ground level for transport. They must be lowered again when it is desired to detach the trailer. Typically, before the trailer is disconnected from the tow vehicle, the jack stanchion will be lowered so that its base firmly contacts the ground, whereby to maintain the trailer tongue elevated for subsequent connection or disconnection. Thus the user is not required to exert extreme effort to lift the full weight of the trailer into alignment with the hitch. When the jack must be used with various vehicles of different sizes, it also may be necessary to crank the jack up or down to align the trailer tongue with the vehicle.

Thus, one major disadvantage encountered with the use of prior art jacks known to me is that the user must manually crank the jack up or down, and the user is not able to selectively disengage the gears to quickly raise or lower the jack when desired. Thus lowering the trailer or vehicle after service involves substantial expenditure of additional effort and time. Manual cranking required to raise or lower the tongue of the trailer to the necessary height to accommodate different vehicles has also proven to be too time-consuming and vexatious.

To overcome this disadvantage, various means for selectively disengaging the gear from the rack have been suggested in the prior art. Of particular relevance to the present invention is Weber et al., U.S. Pat. No. 3,934,852, issued Jan. 27, 1976. The jack described therein includes a worm gear releasably latched in position upon a rack and operatively retained by a tiltable hand crank. When the safety latch is deployed, the user must crank the jack to effectuate lowering or raising of the trailer. To freely slide the jack up or down without cranking, the user must manually depress the latch and simultaneously tilt the crank handle inward to release the gear from the rack. The main advantage of the prior art structure is that it greatly reduces the risk of inadvertent disengagement of the gear, since the user must give considerable attention and effort to release the safety latch.

However, it is my experience that the release mechanism of the Weber '852 reference is extremely cumbersome and inconvenient to use. Moreover, use of the referenced prior art device involves substantial risk of injury to the user, since the release latch is positioned proximate the crank handle where the user's hand may be impacted by the handle when it is released or wedged between the crank handle and the gear housing. Additionally, it is difficult for the unskilled user to readily visually discern whether the safety latch has been released or is still engaged. The user would not be able to readily detect and promptly replace or repair a weakened or defective spring in this prior art device, unexpected accidental release could easily occur. Hence it would be desirable to provide an improved quick-release mechanism for a safety jack which may be safely and conveniently deployed by a user and which is readily monitored in use.

Because a trailer jack is typically a rather costly item, a purchaser would likely be dissuaded from replacing a relatively good jack in the interest of enhanced safety. Moreover, it is unlikely that a user would go to the trouble and expense of replacing an otherwise sturdy, usable jack due to simple failure of the safety latch mechanism. In the prior art known to me, no means are suggested for conveniently replacing a worn or outdated jack gear mechanism or adding safety devices to existing jacks. It would thus seem desirable to provide a jack gear safety mechanism which could be conveniently retrofitted to an existing jack stand.

SUMMARY OF THE INVENTION

The present invention comprises a quick-release rack and pinion safety jack assembly adapted to be semi-permanently coupled to the tongue of a conventional recreational boat trailer by a rigid, adjustable clamp.

The jack assembly comprises a rigid, vertical stanchion preferably terminating at its lower end in a heavy-duty caster wheel. A vertical rack mounted upon the stanchion supports meshes with crank-driven gear assembly. The gear assembly is disposed within a rigid housing which is penetrated by the jack stanchion. Extending outwardly from one side of the gear housing is a rotatable hand crank for manually driving the gear assembly. A spring-biased safety lever is pivotally coupled to opposite sides of the gear housing for selectively engaging or releasing the stanchion from the housing.

The gear assembly comprises a crank-driven worm meshed with a cooperating drive gear to effectuate vertical movement of the gear housing upon the rack in response to rotation of the crank handle. The drive gear is mounted for rotation about a rigid axle which penetrates elongated follower slots defined within opposite gear housing walls. The axle is coupled at its ends to rigid links pivotally coupled to the safety lever. When the safety lever is moved, corresponding movement of the links and thus the drive gear results. When the lever is in its first "lock" position, the drive gear is urged by the links into engagement with the rack, so that the operator may rotate the crank handle to raise or lower the jack. When the lever is manually set in its second "release" position, the drive gear is pushed by the links out of engagement with the rack, so that the stanchion may be quickly moved vertically to the desired height without cranking. When the desired height is attained, the stanchion may then be manually locked into position again. As the lever is moved back into the locked position, the links move overcenter, and thus help safely maintain the lever in the locked position.

The safety lever is biased to its "lock" position by an externally mounted safety spring anchored upon the gear casing. Substantial effort is required to pull the lever out of its lock position, so that the risk of inadvertent release of the lever by a child, for example, is substantially reduced. Fatigue or failure of the externally-mounted safety spring may be easily detected. If necessary, the weakened or damaged spring may be readily replaced to assure continued safe operation of the jack.

The gear housing may be conveniently retrofitted to an existing rack and pinion jack which lacks adequate safety and release mechanisms. After the gear casing of the existing jack is cranked off the jack post, the present casing may be coaxially slid into engagement with the rack and cranked into position. It is necessary merely to drill a handgrip-receptive orifice at the top of the existing jack post to install the present handle.

Thus it is a broad object of the present invention to provide an improved rack and pinion type jack for use in conjunction with trailers or similar vehicles.

A further broad object of the present invention is to provide a rack and pinion jack which includes an improved quick-release mechanism.

Still another broad object of the present invention is to provide a quick-release jack with improved safety features.

Yet another broad object of the present invention is to provide a quick-release gear mechanism which can be readily retrofitted for use upon an existing automotive or trailer jack stand.

Another object of the present invention is to provide a jack which includes external lever means for quickly and conveniently releasing the gears to permit the user to safely raise or lower the jack without cranking.

Yet another object of the present invention is to provide a quick-release jack of the character described which employs selectively releasable drive gear means.

A further object of the present invention is to provide a quick-release jack mechanism of the character described which can be conveniently installed upon an existing jack stand to replace a worn or outdated gear system.

It is a feature of the present invention that the condition and deployment of the safety lever mechanism may be readily monitored by the user.

Another object of the invention is to provide a quick-release jack which can be safely operated by an inexperienced user, and which can be easily serviced.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a fragmentary, side elevational view of the preferred gear housing assembly, illustrating the lever in its first locked position;

FIG. 6 is a sectional view similar to FIG. 5, but illustrating the gear assembly in its second released position; and, FIG. 7 is a fragmentary, reduced scale side sectional view similar to FIG. 3, with portions thereof broken away or omitted for clarity, and with moved positions illustrated in dashed lines.

DETAILED DESCRIPTION

Figure 1:
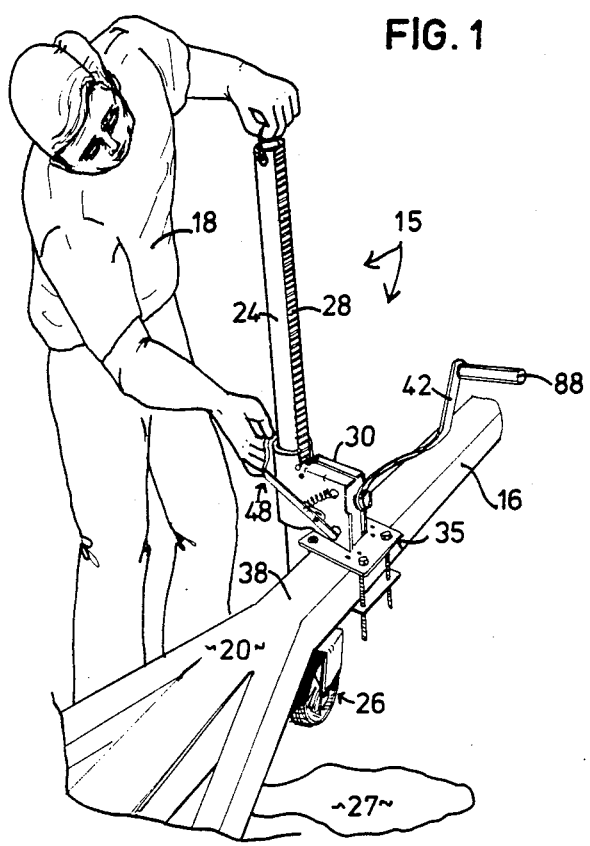
FIG. 1 is a pictorial view, illustrating the best mode of my QUICK RELEASE JACK in use upon a conventional boat trailer.

With initial reference to FIG. 1 of the appended drawings, the best mode of my improved quick-release jack is broadly designated by the reference numeral 15. In use jack 15 is clamped to a trailer tongue 16 associated with a conventional trailer 20. Jack 15 comprises a rigid support stanchion 24 mounted upon a caster assembly 26 which contacts the ground 27 or similar supporting surface when the load is supported. A rigid rack 28 is associated with stanchion 24, which penetrates gear housing 30. A rigid adjustable clamp 35 mounts the jack by securing housing 30 to the trailer tongue 38. Relative vertical displacements between the stanchion and the housing are effectuated in response to rotation of manual crank 42, enabling operator 18 to raise or lower the trailer tongue. A safety quick-release mechanism, broadly designated by the reference numeral 48, permits the operator 18 to quickly temporarily release the stanchion from housing to rapidly adjust the jack without cranking.

Figure 2:
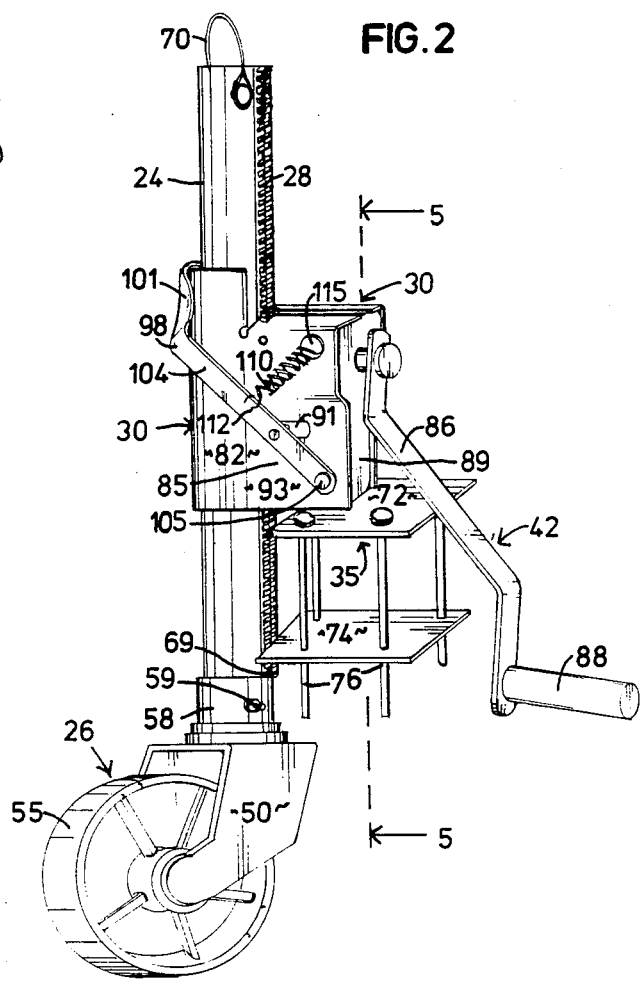
FIG. 2 is an enlarged, front perspective view of the preferred jack assembly.

With specific reference now to FIG. 2, the rigid, generally U-shaped caster mount 50 associated with caster wheel 55 is coupled for swiveling or rotational movement to the lower end of stanchion 24. An intermediate cylindrical cap fitting 58 firmly engages stanchion 24 and is secured thereto by conventional pin 59. Rack 28 comprises a multiplicity of gear-engaging teeth and grooves and is permanently mounted upon stanchion 24 by welds or the like. A terminal stop 69 associated with the lower end of rack 28 prevents gear housing 30 from dropping off out of engagement with the rack. A rigid handle 70 mounted upon the upper end of stanchion 24 facilitates handling of the stanchion and the jack. Mounting clamp 35 comprises a rigid plate 72 permanently welded to housing 30. Plate 72 is maintained in registered alignment with the cooperating base plate 74 by bolts 76. Suitable nuts (not shown) conventionally tighten and secure the apparatus. Plate 72 firmly abuts the upper surface of the trailer tongue, 16 and base plate 74 is firmed against the lower surface of the tongue, so that the tongue is firmly captured between the plates 72 and 74.

Figure 4:
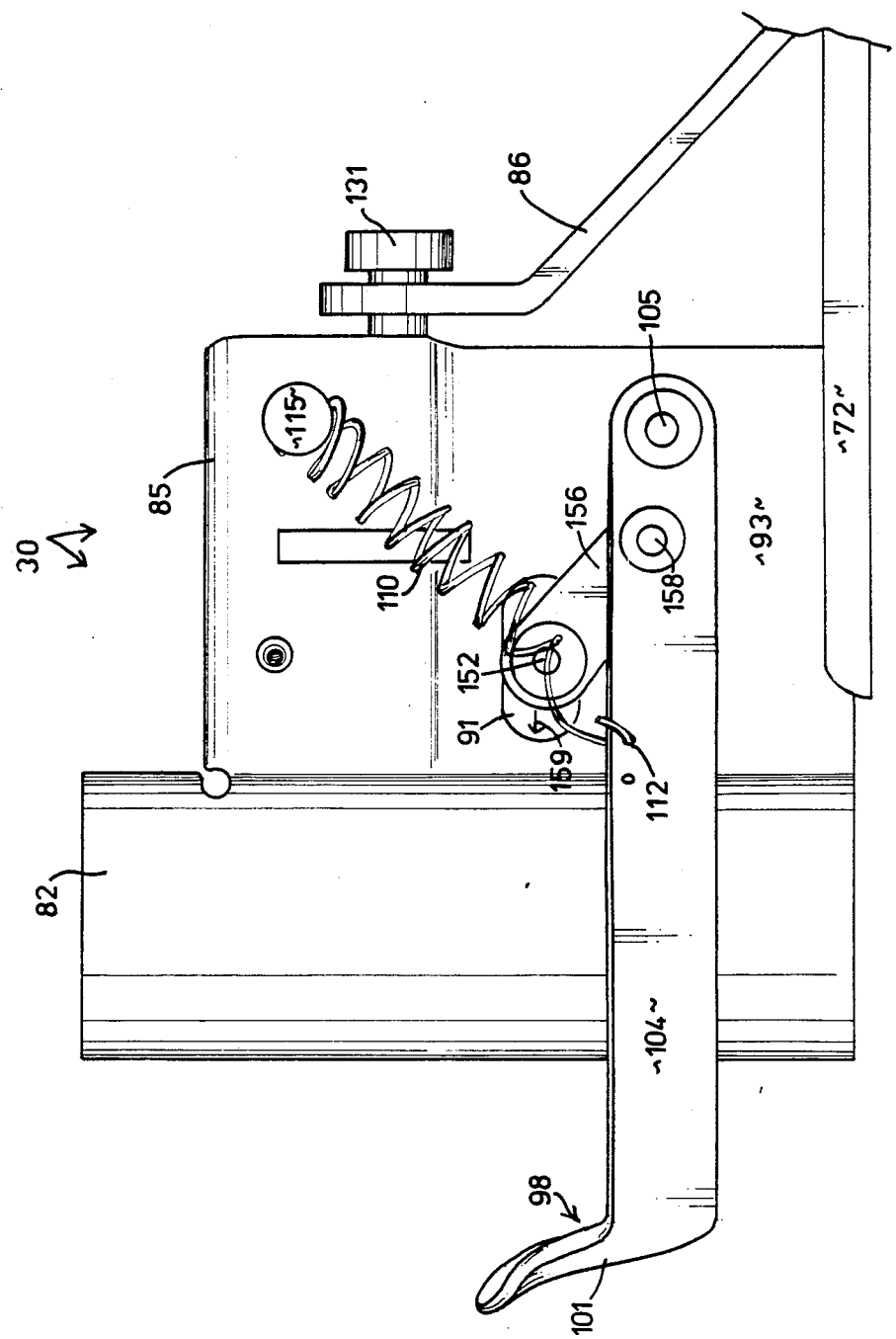
FIG. 4 is a fragmentary, side elevational view similar to FIG. 3, illustrating the lever in its second released position.

With reference to FIGS. 2-4, gear housing 30 comprises a rigid, elongated, generally tubular sleeve 82 which is coaxially, slidably fitted upon jack stanchion 24 and a box-like casing 85 which extends integrally outwardly from sleeve 82 about rack 28. The casing 85 shields the internal operational mechanism of the jack from the elements and prevents harmful contact with the operator's hands. Hand crank 42 comprises a rigid, angular leg 86 and an integral handgrip 88. Crank 42 extends outwardly from face 89 of casing 85 for convenient access by the operator 18. Elongated follower slots 91 are defined in opposing side walls 93 of casing 85 to slidably receive opposing ends of the movable gear axle 152 as described in detail hereinafter.

Safety lever 98 comprises an arcuate handle end 101, and a pair of integral arms 104 extending upon opposite sides of housing 30 and terminating in pivot ends coupled to side walls 93 of the casing at pivot point 105. Lever 98 can pivot along an arcuate path 107 (FIG. 7) between a first, "locked" position at point 107A (FIG. 3) and a second "released" position at point 107B (FIG. 4). The lever thus controls the mechanical interconnection between the stanchion and the housing, as will hereinafter be described.

Lever 98 is preferably biased by an external spring 110 secured to orifice 112 defined in lever arm 104. The spring opposite end is secured by a fastener 115 associated with casing 85. Because spring 110 is externally mounted, it is readily visible and its condition can be easily monitored by the operator 18. If the spring 110 becomes distended or worn, it can be quickly and easily removed and replaced with a new spring. Thus, the risk of mechanical failure of the safety lever is substantially reduced.

Figure 5:
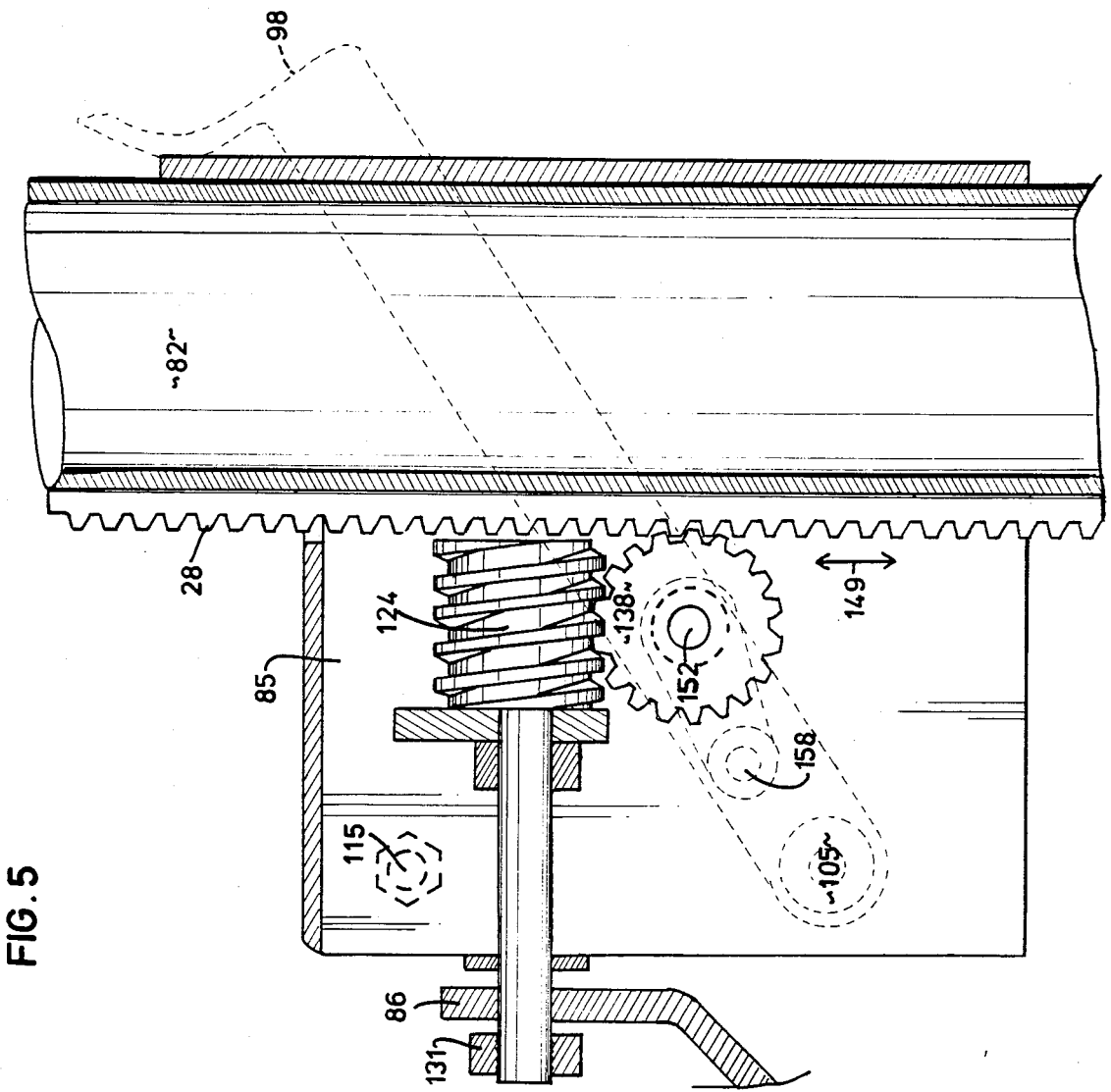
FIG. 5 is a sectional view taken generally along line 5—5 of FIG. 3.

With additional reference now directed to FIGS. 5-7, the jack 15 is driven by a gear assembly, broadly designated by the reference numeral 120, which is enclosed within casing 85. A drive gear 138 is the most important element of the gear assembly. It is switched into and out of contact with the rack 28 by the lever 98 to facilitate release. A rotatable worm gear 124 is meshed with drive gear 138. Worm gear 124 is splined to a rigid drive shaft 128. Shaft 128 penetrates casing face 89 and terminates in crank 42, which is secured thereto by a nut 131 or similar fastener. When the crank is manually rotated by operator 18, the worm gear rotates drive gear 138. Drive gear 138 comprises a hub 141 and a plurality of teeth separated by grooves. Thus rotation of the worm gear results in vertical rotation of drive gear 138 along rack 28 as indicated by arrow 149. When the drive gear is meshed with the rack, movement between the stanchion and the housing results.

Drive gear 138 is mounted for rotation upon a rigid axle 152. Axle 152 traverses the interior of casing 85 and penetrates the follower slots 91 defined through opposite casing walls 93. Axle 152 is rotatably captured at its ends by elongated, rigid links 156 screw-mounted by fasteners 158. Links 156 are rotatably anchored upon arms 104 at a pivot point 160 adjacent the safety lever pivot point 105. Links 156 are sandwiched between arms 104 and casing side walls 93. Links 156 move overcenter, pivoting along an arc opposite arcuate path 107 in response to operator-selective deflection of lever 98. Thus, deflection of links 156 results in straight-line, horizontal movement of drive gear axle 152 within follower slots 91 along a path indicated by arrow 159, which in turn drives drive gear 138 horizontally along worm 124.

As best illustrated in FIGS. 3 and 5, when safety lever 98 is in its first, raised "locked" position, links 156 lie roughly parallel with lever arms 104 and urge drive gear axle 152 rearwardly in the direction of sleeve 82. As drive gear axle moves horizontally toward the rearward limit of follower slot 91, drive gear 183 rotates rearwardly along worm 124 until gear 183 comes into engagement with rack 28. In the locked position, movement of the gear housing upon the stanchion may only be effectuated by manual rotation of the crank handle.

As best viewed in FIGS. 4 and 6, when lever 98 is lowered links 156 move overcenter into roughly perpendicular orientation relative to lever arms 104. Links 156 thus pivot to drive the drive gear axle 152 forward within follower slot 91 generally in the direction of crank 42. As the drive gear axle moves horizontally toward the forward limit of follower slot 91, the drive gear rotates horizontally forward along worm 124, until the drive gear is drawn out of engagement with rack 28. Movement of the jack is thus virtually unrestricted by drive gear 138, and the jack housing 30 may be safely and quickly slid vertically coaxially along stanchion 24 to the desired position without cranking. This facilitates rapid positioning of the jack at the desired elevation.

When it is desired, for example, to quickly raise the jack off the ground for transport as shown in FIG. 1, operator 18 may grasp handle 70 upon stanchion 24 with one hand. With the other hand, operator 18 pushes safety lever 98 downward to the release position, and slides gear housing into the desired position upon the stanchion. It will be appreciated that since both hands are required to effectuate the release, the risk of inadvertent tripping of the assembly is greatly reduced. Additionally, it is noted that the operator's hands are positioned out of reach of the handcrank, whereby the risk of injury from inadvertent contact therewith is eliminated. Once the jack is thus properly positioned, lever 98 may be manually raised to safely re-lock the gear housing into the desired position.

Spring 110 biases lever 98 in its raised "locked" position, whereby substantial effort is required to pull the lever out of its lock position to release the jack for slidable adjustment. Hence, the risk of inadvertent release of the lever by a child, for example, is substantially reduced. Moreover, once the desired position is reached, spring 110 acts to assist quick and easy return of the lever back to the safety lock position.

It will be appreciated that, due to the expense involved, the typical consumer would not invest the substantial amount of money required to replace a jack merely to gain the advantage of improved safety. The present gear housing is so constructed that it may be quickly and conveniently retrofitted onto the stanchion of an existing rack and pinion jack.

To install the housing, operator 18 must disconnect the caster or support base from the existing jack so that the old gear housing may be cranked down and removed from the jackpost. The present gear housing may be slidably installed onto the rack by positioning the safety lever in the release position to prevent damage to the drive gear by contact with the rack during installation. Once the housing is properly positioned so that the gears intermesh, the safety lever may be raised to its lock position. The operator must then drill an orifice through the top of the existing jackpost to mount the present handle, which may be quickly anchored thereto upon a suitable, rigid pin.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A quick-release trailer jack comprising:
   an elongated stanchion comprising a base adapted to contact a supporting surface such as a road;
   a rigid rack secured to said stanchion;
   a rigid housing slidably mounted upon said stanchion;
   clamp means for securing said housing to a trailer tongue;
   a drive gear rotatably confined within said housing and normally meshed with said rack, said drive gear comprising an axle extending between and captivated by elongated follower slots defined in opposite sides of said housing;
   hand-operated crank means for driving said gear to selectively displace said stanchion relative to said housing when said gear is meshed with said rack, said crank means comprising a worm gear confined within said housing and meshed with said drive gear;
   lever means for coupling or uncoupling said drive gear from said rack, said lever means externally associated with said housing and comprising a pivot end pivotally coupled to said housing, and a remote end terminating in a user-accessible handle;
   rigid link means for operatively linking said drive gear axle to said lever means intermediate said pivot end and said handle, said link means comprising an anchor end pivotally coupled to said gear axle and a pivot end pivotally coupled to said lever means, and said link means secured to said lever means between said pivot end and said handle and displaceable overcenter to normally maintain said handle in a locked position;
   said lever means normally assuming a first position effectuating locking of said rack, and deflectable to a second position to quickly release said gear from said rack to disassociate said stanchion from said housing; and,
   whereby pivoting of said lever means by manually deflecting said handle deflects said link whereby to effectuate movement of said drive gear toward or away from said rack.

2. The jack as defined in claim 1 wherein deflection of said link means urges said drive gear into backward rotation along said worm as it is unmeshed from said rack.

3. The jack as defined in claim 2 wherein said lever means further comprises externally mounted, removable spring means anchored to said housing for normally yieldably biasing said lever to said first position.

4. A quick-release trailer jack comprising:
   an elongated stanchion comprising a base adapted to contact a supporting surface such as a road;
   a rigid rack secured to said stanchion;
   a rigid housing movably mounted upon said stanchion;
   means for securing said jack to a trailer tongue;
   a drive gear rotatably confined within said housing and normally meshed with said rack, said drive gear comprising an axle extending between and captivated by elongated follower slots defined in opposite sides of said housing;
   crank means for driving said gear to selectively displace said stanchion relative to said housing when said gear is meshed with said rack, said crank means comprising a worm gear confined within said housing and meshed with said drive gear;
   lever means for coupling or uncoupling said drive gear from said rack, said lever means externally associated with said housing and comprising a pivot end pivotally coupled to said housing, and a remote end terminating in a user-accessible handle;
   cam link means for operatively linking said drive gear axle to said lever means, said cam link means comprising an anchor end pivotally coupled to said gear axle and a pivot end pivotally coupled to said lever means between said pivot end and said handle, said cam link means normally being yieldably displaced overcenter to normally maintain said drive gear in a meshed position with said rack;
   wherein manual deflection of said handle pivots said lever means to deflect said cam link means to uncouple said drive gear from said rack and thus quickly release said stanchion from said housing.

5. The jack as defined in claim 4 wherein deflection of said cam link means urges said drive gear into backward rotation along said worm as it is unmeshed from said rack.

6. The jack as defined in claim 5 wherein said lever means further comprises externally mounted, removable spring means anchored to said housing for normally biasing said lever means in a position to mesh said drive gear with said rack.

7. A gear assembly adapted to be retrofitted to the jack post or stanchion of an existing rack and pinion jack, whereby to enhance the safe operation thereof, said assembly comprising:
   a rigid housing comprising a generally tubular sleeve for engaging the jack post or stanchion of said existing jack and a rigid, hollow, box-like gear assembly cover;
   a drive gear rotatably confined within said cover for selectively engaging said rack of said existing jack, said drive gear comprising an axle extending between elongated follower slots defined in opposite sides of said cover;
   hand-operated crank means for driving said drive gear to selectively elevate or lower said jack post or stanchion, said crank means comprising a worm gear inseparably meshed with said drive gear, said worm gear disposed within said housing generally perpendicular to said stanchion;
   lever means externally associated with said cover for selectively coupling and uncoupling said stanchion from said housing, said lever means comprising a pivot end pivotally coupled to said cover and a remote end terminating in a user-accessible handle;
   link means pivotally secured to said lever means between said pivot end and said handle for coupling said lever means to said drive gear and driving said axle within said follower slot;
   wherein said lever means is normally retained by said link means in a position in which said link means is displaced overcenter and said drive gear is meshed with said rack; and,
   wherein manual deflection of said lever means causes said link means to unmesh said drive gear from said rack, and said stanchion is quickly released form said cover to facilitate raising or lowering of said jack.

* * * * *